United States Patent Office 3,513,168
Patented May 19, 1970

3,513,168
INDENO [1,2-c] PYRIDINES AND 2-GUANYL
DERIVATIVES THEREOF
Ernst Jucker, Ettingen, Anton Ebnother, Reinach, Basel-Land, and Jean-Michel Bastian, Birsfelden, Switzerland, assignors to Sandoz Ltd. (also known as Sandoz A.G.), Basel, Switzerland
No Drawing. Filed July 27, 1967, Ser. No. 656,318
Claims priority, application Switzerland, July 29, 1966, 11,039/66
Int. Cl. C07d 39/00
U.S. Cl. 260—290                4 Claims

ABSTRACT OF THE DISCLOSURE

The invention relates to compounds of the formula

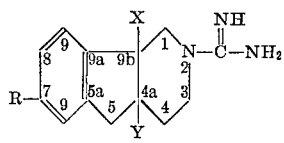

wherein R is hydrogen, chlorine, or lower alkyl of 1 to 4 carbon atoms, and X and Y are hydrogen or X and Y together are a second bond, and their acid addition salts. The compounds of the invention are indicated for use in the treatment of hypertonia.

The present invention relates to new heterocyclic compounds and a process for their production.

The present invention provides heterocyclic guanidine derivatives of Formula I,

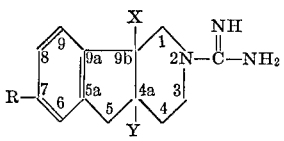

in which R signifies a hydrogen or chlorine atom or an alkyl radical having 1 to 4 carbon atoms, and each of the two symbols X and Y signifies a hydrogen atom, or X and Y together signify a second carbon-carbon bond, and their acid addition salts.

The present invention further provides a process for the production of compounds of Formula I and their acid addition salts, characterized in that an indenopyridine derivative of Formula II,

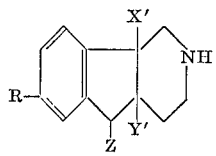

in which R has the above significance, and either each of X', Y' and Z signifies a hydrogen atom, or one of the symbols X' and Z signifies a hydrogen atom and the remaining symbol together with Y' signifies a second carbon-carbon bond, is reacted with a compound of Formula III,

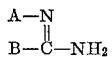

in which either A signifies a hydrogen atom and B signifies an alkoxy or alkylthio radical or a 1-pyrazolyl radical which may optionally be mono- or di-substituted by lower alkyl or aryl, or A and B together signify a third carbon-nitrogen bond, in the presence of at least one equivalent of an acid, when the base of Formula I is required, this is liberated from the resulting salt with an alkali and, when an acid addition salt is required, salification is effected. It should be noted that, when a salt results and a different salt is required, the anion may alternatively be exchanged in manner known per se.

1,2,3,4,4a,9b - hexahydro - 5H - indeno[1,2-c]pyridine, 1,2,3,4-tetrahydro-5H-indeno[1,2-c]pyridine and 1,3,4,9b-tetrahydro-2H-indeno[1,2-c]pyridine may, for example, be used as starting materials of Formula II. The chemical reaction of the process of the invention consists in introducing a guanyl radical at the nitrogen atom of compound II. Suitable compounds of Formula III are O-alkyl-iso ureas, S-alkyl-isothio ureas, 1-guanyl-pyrazol or its derivatives which may be mono- or di-substituted by lower alkyl or aryl, preferably in the 3 and/or 5 position, and cyanamide. When a compound of Formula II, in which X' signifies hydrogen and the two symbols Y' and Z together signify a second carbon-carbon bond (i.e. a 1,3,4,9b-tetrahydro - 2H - indeno[1,2-c]pyridine derivative), is used as starting material, a rearrangement occurs during the reaction with a migration of the double bond from the 4a,5 position to the 4a,9b position, a compound of Formula I in which X and Y together signify a second carbon-carbon bond (i.e. a 2-guanyl-1,2,3,4-tetrahydro-5H-indeno[1,2-c]pyridine derivative) resulting.

The process of the invention may, for example, be effected as follows, depending on the nature of the reaction component III:

In accordance with a first embodiment of the process, a compound of Formula II in a polar solvent, e.g. water or a mixture of water and a lower alkanol, is reacted with an inorganic salt, preferably the chloride, iodide, or sulphate, of an O-alkyl-iso urea or an S-alkyl-isothio urea, e.g. S-methyl-isothio urea sulphate. The mixture is allowed to stand at room temperature for a long time, e.g. for 1 to 3 days and/or is heated to the boil for several hours, whereby an alkanol or an alkylmercaptane results during the reaction. In most cases the resulting acid addition salt of compound I crystallizes from the reaction mixture and is filtered off. When no crystallization occurs, the solvent is evaporated until crystallization commences, or to dryness.

In accordance with a second embodiment of the process a compound of Formula II is reacted, in the presence of one equivalent of an acid, with 1-guanyl-pyrazol or with a derivative thereof which may be mono- or di-substituted by lower alkyl or aryl in the 3 and/or 5 position. For the purpose of ensuring the presence of one equivalent of an acid, the compound II or the guanyl-pyrazol is preferably used in the form of an acid addition salt, e.g. the hydrochloride. For example, 1,2,3,4,4a, 9b-hexahydro-5H-indeno[1,2-c]pyridine is maintained at the boil together with 1-guanyl-pyrazol hydrochloride (in a suitable organic solvent, e.g. chloroform) for 1 to 5 hours, or 1,3,4,9b - tetrahydro-2H-indeno[1,2-c]pyridine hydrochloride is heated on a boiling water bath with 1-guanyl-pyrazol in water for 30 minutes. The reaction mixture is subsequently allowed to cool and the hydrochloride of the resulting 2-guanyl-indeno[1,2-c]pyridine derivative, which crystallizes, is filtered off.

In accordance with a further embodiment of the process, a compound of Formula II is allowed to react with cyanamide in a suitable polar solvent, e.g. ethanol, and in the presence of at least one equivalent of an acid. For this purpose the compound II is preferably used in the form of an acid addition salt, e.g. the hydrochloride, or an acid, e.g. sulphuric acid, is added to the reaction solution. The reaction is effected at room temperature or at an elevated temperature, e.g. at the boil at reflux, for about 5 to 25 hours.

Upon cooling the reaction mixture the resulting compound I usually precipitates in the form of an acid addition salt; when no precipitation occurs the solvent is partially or completely removed by evaporation.

The crude acid addition salts of the guanidine compounds I obtained by the above embodiments of the process may subsequently be purified in manner known per se, preferably by crystallization from water, methanol or ethanol. Upon treating with an alkali, preferably with an anion exchange resin which has been pretreated with an alkali, they yield the free bases of Formula I, which may be converted into their acid addition salts by reacting with inorganic or organic acids. These acid addition salts are also included in the present invention. Examples of acids for acid addition salt formation are: hydrochloric, hydrobromic, sulphuric, phosphoric, methanesulphonic, p - toluene - sulphonic, naphthalene - 1,5 - disulphonic cyclohexylsulphamic, maleic, benzoic, hexahydrobenzoic, fumaric, malic, tartaric and citric acid.

It is also possible, however, to exchange the anion of the resulting salts by a double decomposition reaction. Thus, for example, by treating the sulphates with an aqueous barium chloride solution the corresponding hydrochlorides are obtained, whereby the sparingly soluble barium sulphate results as by-product. Reaction of the hydrochloride with an aqueous silver sulphate solution yields the corresponding sulphate and the sparingly soluble silver chloride in analogous manner.

The compounds of Formula II used as starting materials may be produced by heating ketones of Formula IV,

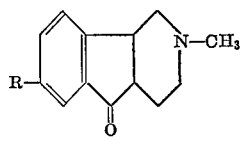

IV in which R has the above significance, with a lower alkyl ester of chloroformic acid, and hydrolyzing the resulting N-alkoxycarbonyl derivatives to form ketones which are unsubstituted on the nitrogen atom. These are reduced, for example by catalytic hydrogenation, to the corresponding carbinols of Formula V,

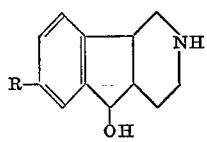

V in which R has the above significance. Upon heating compound V with strong acids, salts of compounds of Formula II, in which X' signifies hydrogen and Y' and Z together signify a second bond (i.e. salts of 1,3,4,9b-tetrahydro-2H-indeno[1,2-c]pyridine derivatives), are obtained. Upon liberating the bases from these salts with an alkali, a rearrangement occurs (with a migration of the double bond) to yield compounds of Formula II, in which X' and Y' together signify a second bond and Z signifies hydrogen (i.e. 1,2,3,4-tetrahydro-5H-indeno[1,2-c]pyridine derivatives). Catalytic hydrogenation of the 1,3,4,9b- or 1,2,3,4,-tetrahydro compounds indicated above yields compounds of Formula II, in which each of X', Y' and Z signifies a hydrogen atom, i.e. 1,2,3,4,4a,9b-hexahydro-5H-indeno[1,2-c]pyridine derivatives. These derivatives may also be produced from the ketones of Formula IV by a modification of the process described above: The corresponding carbinols are obtained by reduction, e.g. by catalytic hydrogenation or with complex alkali metal hydrides, water is split off from these with an acid and the resulting salts of the 2-methyl-1,3,4,9b-tetrahydro-2H-indeno[1,2-c]pyridine derivatives are catalytically hydrogenated. The resulting 2-methyl-1,2,3,4,4a,9b-hexahydro-5H-indeno[1,2-c]pyridine derivatives are heated with lower alkyl esters of chloroformic acid, whereby the corresponding N-(lower) alkoxycarbonyl compounds of Formula VI,

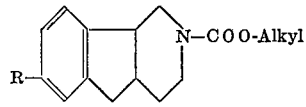

VI in which R has the above significance, are obtained. Hydrolysis of these compounds yields the 1,2,3,4,4a,9b-hexahydro-5H-indeno[1,2-c]pyridine derivatives unsubstituted on the nitrogen atom (Formula II, X'=Y'=Z=H).

The ketones of Formula IV may, for example, be produced as follows:

A lower alkyl ester of tetrahydro-isonicotinic acid of Formula VII

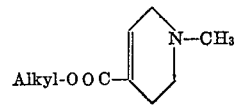

VII is subjected to a Grignard reaction with a compound of Formula VIII,

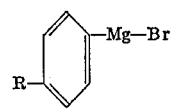

VIII in which R has the above significance, the reaction product is hydrolyzed and the resulting lower alkyl ester of Formula IX,

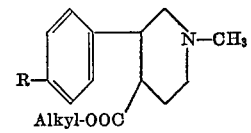

IX in which R has the above significance, is cyclized by treating with polyphosphoric acid or by hydrolyzing to the free acid, producing the acid chloride, and treating the resulting compound with anhydrous aluminum chloride.

The guanidine derivatives of Formula I have hitherto not been described in the literature. They exhibit a pronounced antihypertensive effect while their toxicity is low. They are therefore indicated for use in the treatment of hypertonia. A suitable average daily dose of Compounds I is 0.15 to 7 mg./kg. body weight of warm-blooded animal.

The compounds of the invention and their water-soluble physiologically tolerated acid addition salts may be used as pharmaceuticals on their own or in the form of appropriate medicinal preparations, e.g. tablets, dragées, injectable solutions, suppositories, for administration, e.g. enterally or parenterally. Aside from the usual inorganic and organic, pharmacologically inert adjuvants, e.g. lactose, starch, talcum, stearic acid, water, alcohols, glycerin, natural or hardened oils and waxes, the preparations may also contain suitable preserving, stabilizing and wetting agents, solubilizers, sweetening and colouring substances and flavourings.

The term "in manner known per se" as used herein designates methods in use or described in the literature on the subject.

In the following non-limitative example all temperatures are indicated in degrees centigrade and are uncorrected.

EXAMPLE 1

2-guanyl-1,2,3,4,4a,9b-hexahydro-5H-indeno[1,2-c]pyridine

A solution of 4.8 g. of S-methyl-isothio urea sulphate in 25 cc. of water is added to a solution of 5.7 g. of 1,2,3,4,4a,9b-hexahydro-5H-indeno[1,2-c]pyridine in 200 cc. of methanol and 15 cc. of water. The mixture is allowed to stand at room temperature for 3 days and the bis-(2-guanyl-1,2,3,4,4a,9b - hexahydro-5H-indeno[1,2-c]pyridine) sulphate which crystallizes, is filtered off.

M.P. 292–295° (decomp.) after crystallization from hot water.

The 1,2,3,4,4a,9b-hexahydro-5H-indeno[1,2-c]pyridine used as starting material, is produced as follows:

(a) 2-methyl-1,2,3,4,4a,9b - hexahydro-5H-indeno[1,2-c]pyridin-5-ol.—A solution of 20.0 of 2-methyl-1,2,3,4,4a,9b-hexahydro-5H-indeno[1,2-c]pyridin-5-one in 150 cc. of ethanol is shaken with hydrogen and 0.5 g. of platinum oxide at 60° and 6 atmospheres, until the calculated amount of hydrogen has been taken up. The catalyst is filtered off, the filtrate is concentrated by evaporation and the residue is crystallized from isopropanol. The compound indicated in the heading has a M.P. of 143–145°.

(b) 2-methyl-1,3,4,9b-tetrahydro - 2H-indeno[1,2-c]pyridine.—20.0 g. of 2-methyl-1,2,3,4,4a,9b-hexahydro-5H-indeno[1,2-c]pyridin-5-ol are heated to the boil at reflux in 200 cc. of 2 N hydrochloric acid for 20 minutes. Cooling is then effected to 0° and the precipitated hydrochloride of the compound indicated in the heading is filtered off, dried in an exsiccator and recrystallized from methanol. M.P. 265° (decomp.).

(c) 2-methyl-1,2,3,4,4a,9b - hexahydro-5H-indeno[1,2-c]pyridine.—A solution of 20 g. of 2-methyl-1,3,4,9b-tetrahydro-2H-indeno[1,2-c]pyridine hydrochloride in 240 cc. of glacial acetic acid is shaken with hydrogen in the presence of a palladium catalyst, until the calculated amount of hydrogen has been taken up. The catalyst is filtered off, the filtrate is concentrated by evaporation and the residue is taken up in water; the resulting solution is made alkaline with a 50% caustic potash solution while cooling and is extracted several times with ether. The ether layers are combined, dried over potassium carbonate and concentrated by evaporation. The residue is distilled in a high vacuum, whereby the compound indicated in the heading distils over at 79°/0.1 mm. of Hg. The hydrobromide has a M.P. of 192–194° (decomp.) after crystallization from isopropanol.

(d) 1,2,3,4,4a,9b-hexahydro-5H - indeno[1,2-c]pyridine.—A solution of 54 g. of chloroformic acid ethyl ester in 100 cc. of benzene is added dropwise to a solution of 31.1 g. of 2-methyl-1,2,3,4,4a,9b-hexahydro-5H-indeno[1,2-c]pyridine in 380 cc. of benzene, whereby the temperature rises to about 35°. The solution is heated at reflux for 3 hours, is allowed to cool, and the reaction mixture is washed first with water, then twice with dilute hydrochloric acid and finally thrice with water. The organic phase which has been dried over magnesium sulphate is concentrated by evaporation and the crude 2-ethoxycarbonyl-1,2,3,4,4a,9b-hexahydro-5H-indeno[1,2-c]pyridine obtained as residue is heated to the boil at reflux with a solution of 40 g. of potassium hydroxide in 400 cc. of butanol for 9 hours in an atmosphere of nitrogen. After cooling the reaction mixture 300 cc. of ether are added, shaking out is effected 4 times, each time with 200 cc. of water, and the water washings are discarded. The organic phase is extracted 4 times, each time with 250 cc. of 5% aqueous acetic acid, the extracts are made alkaline with sodium hydroxide while cooling and shaking out is effected with ether. The ether extract is dried over potassium carbonate and concentrated by evaporation. The residue is distilled in a high vacuum, whereby 1,2,3,4,4a,9b-hexahydro-5H-indeno[1,2-c]pyridine distils over at 140–142°/12 mm. of Hg as a colourless oil which crystallizes in a refrigerator. The hydrochloride has a M.P. of 194–195° (decomp.) after crystallization from isopropanol.

EXAMPLE 2

2-guanyl-1,2,3,4,4a,9b-hexahydro-5H-indeno[1,2-c]pyridine 5 g. of 1,2,3,4,4a,9b-hexahydro - 5H-indeno[1,2-c]pyridine and 4.25 g. of 1-guanylpyrazole hydrochloride are heated to the boil at reflux in 120 cc. of chloroform for 1½ hours. After cooling the reaction mixture, the 2-guanyl-1,2,3,4,4a,9b - hexahydro-5H-indeno[1,2-c]pyridine hydrochloride which crystallizes is filtered off and recrystallized from ethanol. M.P. 245–247° (decomp.).

EXAMPLE 3

2-guanyl-1,2,3,4,4a,9b-hexahydro-5H-indeno[1,2-c]pyridine 5.2 g. of 1,2,3,4,4a,9b-hexahydro-5H-indeno[1,2-c]pyridine hydrochloride and 1.0 g. of cyanamide are heated to the boil at reflux in 25 cc. of ethanol for 24 hours. The reaction mixture is then concentrated to half its volume and cooled. Upon rubbing 2-guanyl-1,2,3,4,4a,9b-hexahydro-5H - indeno[1,2-c]pyridine hydrochloride crystallizes, is filtered off and recrystallized twice from ethanol. M.P. 245–247° (decomp.).

EXAMPLE 4

2-guanyl-1,2,3,4-tetrahydro-5H-indeno[1,2-c]pyridine 2.6 g. of 1-guanylpyrazol are added to a solution of 5 g. of 1,3,4,9b-tetrahydro-2H-indeno[1,2-c]pyridine hydrochloride in 50 cc. of hot water and heating is effected on a boiling water bath for 30 minutes. After cooling the reaction mixture the resulting precipitate is filtered off and recrystallized from water and then from methanol. 2-guanyl-1,2,3,4-tetrahydro-5H-indeno[1,2-c]pyridine hydrochloride having a M.P. of about 300–305° with decomposition, is obtained; upon heating over 260°, the compound takes a brown colour.

The 1,3,4,9b-tetrahydro-2H-indeno[1,2-c]pyridine hydrochloride used as starting material may, for example, be produced as follows:

(a) 1,2,3,4,4a,9b-hexahydro-5H-indeno[1,2-c]pyridin-5-one hydrochloride.—A solution of 36.0 g. of chloroformic acid ethyl ester in 50 cc. of benzene is added dropwise to a solution of 20.0 g. of 2-methyl-1,2,3,4,4a,9b-hexahydro-5H-indeno[1,2-c]pyridin-5-one in 200 cc. of absolute benzene while stirring well during the course of 20 minutes. The mixture is heated to the boil at reflux for 3 hours, is cooled and shaken out first with 200 cc. of water, then twice, each time with 100 cc. of 1 N hydrochloric acid and then with water, the organic phase is dried over magnesium sulphate and concentrated by evaporation. The resulting crude, viscous oil is heated to the boil at reflux with 450 cc. of 5 N hydrochloric acid for about 40 hours. The mixture is then evaporated to dryness in a vacuum and the residue is crystallized from ethanol. The compound indicated in the heading has a M.P. of 235–238° (decomp.).

(b) 1,2,3,4,4a,9b - hexahydro - 5H - indeno[1,2-c]pyridin-5-ol hydrochloride.—A solution of 20.0 g. of 1,2,3,4,4a,9b - hexahydro - 5H-indeno[1,2-c]pyridin-5-one hydrochloride in 250 cc. of methanol is shaken with 0.4 g. of platinum oxide and hydrogen, until the calculated amount of hydrogen has been taken up. The catalyst is subsequently filtered off, the filtrate is concentrated by evaporation in a vacuum and the residue is crystallized from isopropanol. The compound indicated in the heading has a M.P. of 200–202° (decomp.).

(c) 1,3,4,9b - tetrahydro - 2H - indeno[1,2 - c]pyridine hydrochloride.—10.0 g. of 1,2,3,4a,9b-hexahydro-5H-indeno[1,2-c]pyridin-5-ol hydrochloride are heated to the boil at reflux with 40 cc. of 2 N hydrochloric acid for 20 minutes. The mixture is then cooled to 0° and the precipitated 1,3,4,9b-tetrahydro-2H-indeno[1,2-c]pyridine hydrochloride is filtered off, dried in a vacuum and recrystallized from methanol. M.P. 302–308° (decomp.).

EXAMPLE 5

2-guanyl-1,2,3,4-tetrahydro-5H-indeno[1,2-c]pyridine 2.9 g. of 1-guanylpyrazol hydrochloride are added to a solution of 1,2,3,4-tetrahydro-5H-indeno[1,2-c]pyridine in chloroform (production see below) and heated at reflux for 1½ hours. After cooling the reaction mixture the precipitated hydrochloride of the compound mentioned in the heading is filtered off and recrystallized from methanol. M.P. about 300–305° (decomp.), brown colouration over 260°.

The starting material is produced as follows:

5 g. of 1,2,3,4,4a,9b-hexahydro-5H-indeno[1,2-c]pyridin-5-ol hydrochloride (see Example 4b) are heated to the boil at reflux with 50 cc. of 2 N hydrochloric acid for 30 minutes, whereby a splitting off of water to give 1,3,4,9b-tetrahydro-2H-indeno[1,2-c]pyridine hydrochloride occurs. The reaction mixture is cooled and made alkaline with 50% caustic potash solution. The 1,2,3,4-tetrahydro-5H-indeno[1,2-c]pyridine resulting by the rearrangement of the liberated base is extracted 4 times with 20 cc. of chloroform. The combined organic extracts are dried over magnesium sulphate, after 3 hours filtration is effected, the residue is washed twice, each time with 20 cc. of chloroform and the filtrate, i.e. the solution of crude 1,2,3,4-tetrahydro-5H-indeno[1,2-c]pyridine in chloroform, is used as starting material for the above described reaction with 1-guanylpyrazol hydrochloride.

EXAMPLE 6

Galenical preparation:

| | Tablets, g. |
|---|---|
| 2 - guanyl - 1,2,3,4,4a,9b - hexahydro - 5H-indeno[1,2-c]pyridine hydrochloride (Examples 2 and 3) | [1] 0.0583 |
| Dimethyl-silicone oil | 0.0005 |
| Magnesium stearate | 0.0010 |
| Polyethylene glycol 6000 | 0.0015 |
| Polyvinyl pyrrolidone | 0.0040 |
| Talcum | 0.0050 |
| Maize starch | 0.0100 |
| Lactose | 0.0797 |
| For a tablet of | 0.1600 |

[1] Corresponds to 0.050 g. of the free base.

What is claimed is:
1. A compound of the formula:

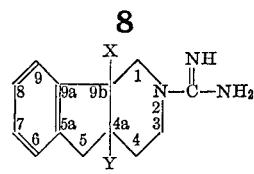

wherein R is hydrogen, chlorine, or lower alkyl of 1 to 4 carbon atoms, and X and Y are hydrogen or X and Y together are a second bond, and their pharmaceutically acceptable acid addition salts.

2. A compound according to claim 1, in which the compound is 2-guanyl-1,2,3,4,4a,9b-hexahydro-5H-indeno[1,2-c]pyridine or a pharmaceutically acceptable acid addition salt thereof.

3. A compound according to claim 1, in which the compound is 2 - guanyl - 1,2,3,4 - tetrahydro - 5H - indeno-[1,2-c]pyridine or a pharmaceutically acceptable acid addition salt thereof.

4. A compound of the formula:

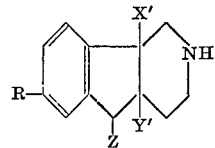

wherein X' and Y' together are a second bond and Z is hydrogen, or wherein each of X', Y', and Z is hydrogen and R has the significance stated in claim 1.

References Cited

UNITED STATES PATENTS 3,408,353  10/1968  Jucker et al. _____ 260—293

HENRY R. JILES, Primary Examiner

G. T. TODD, Assistant Examiner

U.S. Cl. X.R.

260—293, 293.4, 294, 294.3, 294.7, 295, 296; 424—263, 267

UNITED STATES PATENT OFFICE
CERTIFICATE OF CORRECTION

Patent No. 3,513,168　　　　　　　　　Dated May 19, 1970

Inventor(s) Ernst JUCKER et al.

It is certified that error appears in the above-identified patent and that said Letters Patent are hereby corrected as shown below:

Claim 1, in the formula, insert --R--- at the No. 7 position of the ring.

SIGNED AND
SEALED
SEP 15 1970

(SEAL)
Attest:

Edward M. Fletcher, Jr.
Attesting Officer

WILLIAM E. SCHUYLER, JR.
Commissioner of Patents